United States Patent
Taveau et al.

(10) Patent No.: US 9,225,710 B2
(45) Date of Patent: Dec. 29, 2015

(54) SECURE ELEMENTS BROKER (SEB) FOR APPLICATION COMMUNICATION CHANNEL SELECTOR OPTIMIZATION

(71) Applicant: EBAY INC., San Jose, CA (US)

(72) Inventors: Sebastien Taveau, Redwood City, CA (US); John Hastings Granbery, Boston, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/507,343

(22) Filed: Oct. 6, 2014

(65) Prior Publication Data
US 2015/0026781 A1 Jan. 22, 2015

Related U.S. Application Data

(63) Continuation of application No. 13/603,242, filed on Sep. 4, 2012, now Pat. No. 8,862,767.

(60) Provisional application No. 61/530,636, filed on Sep. 2, 2011.

(51) Int. Cl.
| G06F 15/16 | (2006.01) |
| H04L 29/06 | (2006.01) |
| H04W 12/08 | (2009.01) |
| G06Q 20/32 | (2012.01) |
| H04W 4/00 | (2009.01) |

(52) U.S. Cl.
CPC ............ *H04L 63/08* (2013.01); *G06Q 20/3227* (2013.01); *H04W 4/003* (2013.01); *H04W 4/008* (2013.01); *H04W 12/08* (2013.01)

(58) Field of Classification Search
USPC ............ 709/232, 203, 200, 217, 224; 726/10, 726/27
See application file for complete search history.

(56) References Cited

U.S. PATENT DOCUMENTS

| 2008/0147508 A1* | 6/2008 | Liu et al. .......................... 705/17 |
| 2009/0261172 A1* | 10/2009 | Kumar et al. .................. 235/492 |
| 2010/0029202 A1* | 2/2010 | Jolivet et al. ................. 455/41.1 |

* cited by examiner

*Primary Examiner* — El Hadji Sall
(74) *Attorney, Agent, or Firm* — Haynes and Boone, LLP

(57) ABSTRACT

Systems and methods for managing concurrent secure elements on a mobile device to coordinate with an application or "app" running on the mobile device and an appropriate communications protocol for conducting transactions using the mobile device include: informing, by the processor, the reader device of a preferred app and a communication protocol usable by the preferred app; receiving, by the processor, information about which apps and communication protocols are supported by a reader for processing a transaction; locating, by the processor, a secure element supporting an app and a communication protocol supported by the reader; channeling the communication protocol for the specific configuration of the app and the supporting secure element; activating the secure element that supports the app; and processing, with the activated secure element, using the supported app and communication channel, the transaction with the reader.

20 Claims, 3 Drawing Sheets

|  |  | UICC | | | | eSE/mSD | | | | vSE | | | |
|---|---|---|---|---|---|---|---|---|---|---|---|---|---|
|  |  | App1 | App2 | App3 | App4 | App1 | App2 | App3 | App4 | Trustlet1 | Trustlet2 | Trustlet3 | Trustlet4 |
| Protocols |  |  |  |  |  |  |  |  |  |  |  |  |  |
|  | CE |  | X |  |  | X |  | X |  |  | X | X |  |
|  | LLCP |  | X | X | X |  |  |  |  |  |  |  | X |
|  | NDEF | X |  |  |  | X | X | X | X | X |  |  |  |
| Kernel |  |  |  |  |  |  |  |  |  |  |  |  |  |
| 1 | Visa |  |  | X |  |  |  | X |  |  | X |  |  |
| 2 | MC |  |  |  | X |  | X |  |  |  |  |  |  |
| 3 | Amex |  |  |  |  |  |  |  |  |  |  |  |  |
| 4 | PP |  | X |  |  |  | X |  |  | X |  |  |  |
| 5 | Google |  |  |  | X |  |  |  |  |  |  | X |  |
| 6 | Isis | X |  |  |  |  |  |  |  |  |  |  | X |
| Preferences |  |  |  |  |  |  |  |  |  |  |  |  |  |
|  | Reward |  | X | X |  |  |  |  |  |  | X |  |  |
|  | Coupon | X |  |  |  |  |  |  |  |  | X |  |  |

300

|  |  | UICC | | | | eSE/mSD | | | | vSE | | | |
| --- | --- | --- | --- | --- | --- | --- | --- | --- | --- | --- | --- | --- | --- |
|  |  | App1 | App2 | App3 | App4 | App1 | App2 | App3 | App4 | Trustlet1 | Trustlet2 | Trustlet3 | Trustlet4 |
| Protocols | CE |  | X |  |  |  |  |  |  |  |  |  |  |
|  | LLCP |  |  | X | X |  |  |  |  |  |  |  | X |
|  | NDEF | X |  |  |  |  |  |  |  |  |  |  |  |
| Kernel | 1 Visa |  |  | X |  |  | X |  |  |  | X |  |  |
|  | 2 MC |  |  |  | X |  | X | X |  |  | X |  |  |
|  | 3 Amex |  |  |  |  |  |  |  |  | X | X |  |  |
|  | 4 PP |  | X |  |  |  | X |  | X |  |  |  |  |
|  | 5 Google |  |  |  |  | X |  |  |  |  |  | X |  |
|  | 6 Isis | X |  |  |  |  |  |  |  |  |  |  | X |
| Preferences | Reward |  | X | X |  |  |  |  |  | X |  |  |  |
|  | Coupon | X |  |  |  |  |  |  |  | X |  |  | X |

FIG. 3

SECURE ELEMENTS BROKER (SEB) FOR APPLICATION COMMUNICATION CHANNEL SELECTOR OPTIMIZATION

CROSS REFERENCE TO RELATED APPLICATIONS

This application is a continuation of co-pending U.S. patent application Ser. No. 13/603,242, filed Sep. 4, 2012, and claims the benefit of priority from U.S. Provisional Patent Application No. 61/530,636, filed Sep. 2, 2011, both of which are incorporated by reference in their entirety.

BACKGROUND

1. Technical Field

Embodiments of the present invention generally relate to commerce using a consumer mobile device and wireless communication and, more particularly, to managing concurrent secure elements on the mobile device to coordinate with an application or "app" running on the mobile device and an appropriate communications protocol for conducting transactions using the mobile device.

2. Related Art

One issue with today's mobile device or consumer electronic devices is that most of the time, the devices can handle only one secure element (SE). A secure element may be briefly described as a system for storing private data—such as a digital identification (ID) of the payer, e.g., user of the mobile device—in such a way that it is very difficult to compromise. For example, a secure element of a device may be located in a Universal Integrated Circuit Card (UICC), a Subscriber Identity Module (SIM) card, Secure Data (SD) card or embedded Secure Element (eSE), any of which may be plugged into or otherwise connected with the mobile device. With smart phones, it is becoming more and more common to see two or more secure elements in a single device. Current rules—such as those promulgated by standardization bodies like GlobalPlatform—allow only one SE to be active at a time or require one SE to be dominant while the other SEs are slaves.

BRIEF DESCRIPTION OF THE DRAWINGS

FIG. 3 is an example of a matrix diagram illustrating a portion of a system for managing concurrent secure elements on a mobile device in accordance with an embodiment.

Figure 1:
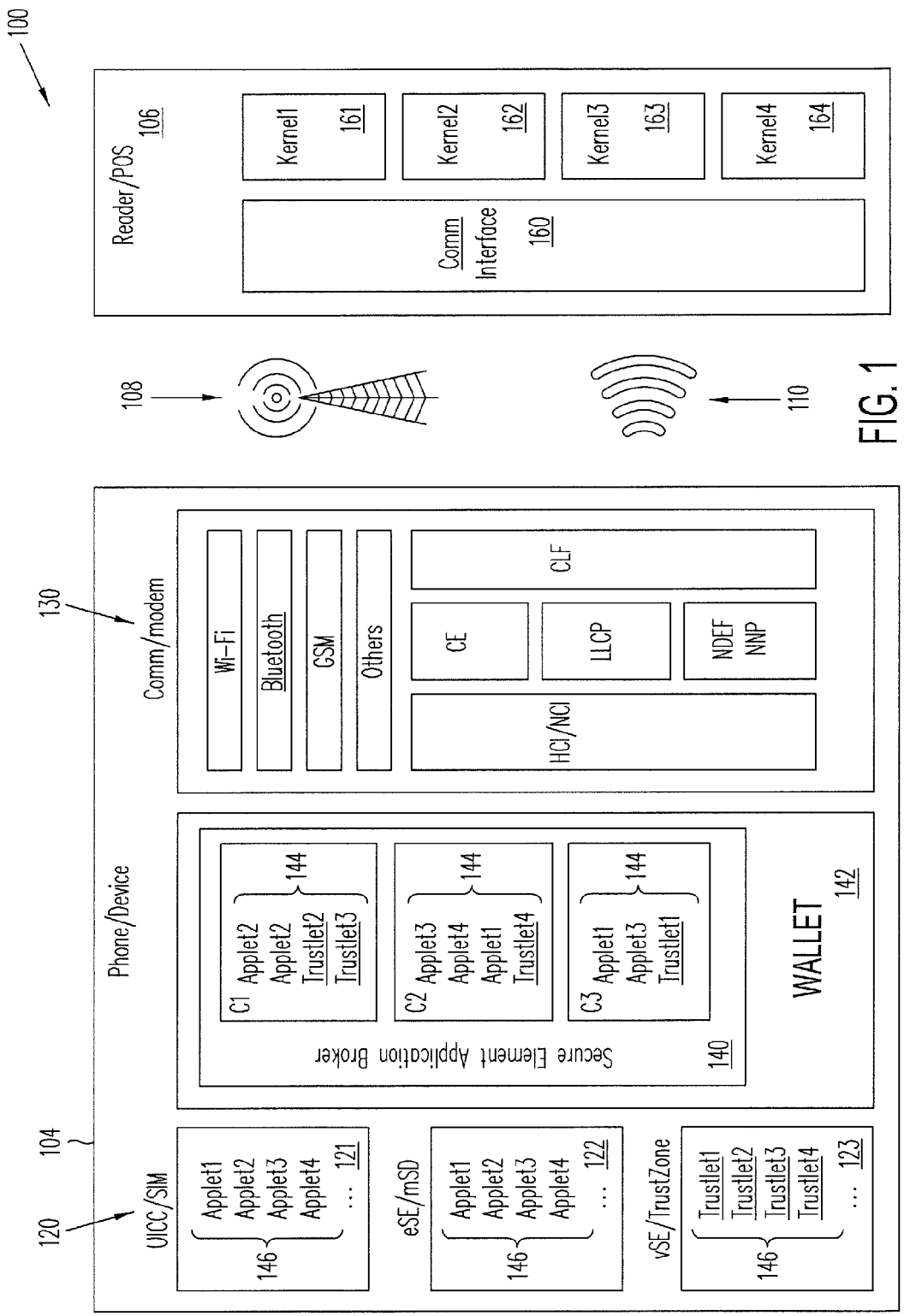
FIG. 1 is a system block diagram illustrating a system for managing concurrent secure elements on a mobile device in accordance with one or more embodiments of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems according to one or more embodiments provide for managing concurrent secure elements on a mobile device to coordinate with an application or "app" running on the mobile device and an appropriate communications protocol for conducting transactions using the mobile device. One embodiment provides a mechanism for allowing the selection of a proper communication protocol linked to a specific "secured" application (e.g., an application residing in a secure element) even within a multi-SE and multi-application environment.

In one or more embodiments, a secure elements broker (SEB) may operate in multi-SE environment (e.g., a mobile device having more than one functioning SE) by regarding all SEs as being in "sleeping mode" and with an SE being called upon by the secure elements broker only when an app that uses the called SE is requested or launched. This operating principle may allow better management of concurrent SEs and their functions, create equality and priority among the concurrent SEs based on optimized connectivity and selection, organize one or more multi-storage zones for secure application content, and circumvent the issue of which SE should always be on. While future secure element architectures may allow for concurrent SEs to run simultaneously, this operating principle of a secure elements broker would still be valid and provide similar advantages.

Moreover, while a "physical" result (such as SE calls in hardware) may occur from using the secure elements broker, the secure elements broker also employs logical functions, for example, managing containers of lists either via logs by application or via preferences by user. For example, the secure elements broker may reside and execute from within a "wallet" (e.g., a virtual wallet on a mobile device that allows a user to easily use various mobile apps and organize them into "containers") as an underlying mechanism. The applications may be marked with a special identifying mechanism at the communication protocol level. Then similar apps, regardless of which secure element they are stored in, may be "listed" in a container from within the secure elements broker. When the device is presented to a reader, e.g., at a point of sale (POS), or other device requesting a communication via a specific channel (e.g., Wi-Fi vs. Bluetooth), the secure elements broker may answer by (figuratively) saying "here is the list of apps I know about in container X that support your protocol." At that point, an application selection may be triggered and the proper SE may be "powered up" to deliver the real app, e.g., the applet in the secure element that selected app calls on. Thus, even if the secure elements broker is broken (e.g., security compromised, "hacked") it would still not be possible to use that compromise in order to access the real (e.g., the secure element-residing applet) app.

In another alternative embodiment, the secure elements broker mechanism may be moved one level up in the wallet, giving the user a way to organize his or her apps in the wallet based on various use cases (e.g., apps for transit, apps for payment, apps for fun).

In one or more embodiments, methods, systems, and computer program products are provided for managing concurrent secure elements on a mobile device to coordinate with an application or "app" running on the mobile device and an appropriate communications protocol for conducting transactions using the mobile device. For example, a method may include: informing, by the processor, the reader device of a preferred app and a communication protocol usable by the preferred app; receiving, by the processor, information about which apps and communication protocols are supported by a reader for processing a transaction; locating, by the processor, a secure element supporting an app and a communication protocol supported by the reader; channeling the communication protocol for the specific configuration of the app and the supporting secure element; activating the secure element that supports the app; and processing, with the activated secure element, using the supported app and communication channel, the transaction with the reader.

FIG. 1 illustrates a system 100 for managing concurrent secure elements on a mobile device in accordance with one or more embodiments. System 100 may include a mobile device 104, e.g., a consumer electronic device such as a mobile phone or smartphone. Mobile device 104 may be enabled for various forms of communication such as, for example, Wi-Fi, Bluetooth, Global System for Mobile (GSM), or near-field communication (NFC). Thus mobile device 104 may communicate with reader 106 (e.g., a point of sale (POS) terminal) using a wireless protocol via a wireless communication channel 108, for example, or using an NFC protocol via an NFC channel 110. Between the two devices, the communication channels are illustrated by a telco tower (for wireless communication channel 108) and the contactless symbol (for NFC channel 110) to illustrate that the range of connectivity is not limited to one mode or the other because the secure elements broker 140 could be used in a proximity or a remote mode. In addition, a "hard wired" connected mode is also possible.

Mobile device 104 may include a security area 120. Security area 120 may include any combination of secure elements 121, 122, 123. For example, a UICC or SIM card secure element 121, usually controlled by carriers or networks; an embedded Secure Element (eSE) or micro-SD (mSD) card secure element 122, usually controlled by handset makers or service providers; or a virtual Secure Element (vSE) or Trust Zone secure element 123.

Mobile device 104 may include a communication module 130. Communication module 130 may integrate modem-like functionalities and may be a portion of system 100 that "connects" the mobile device 104 to another device such as reader device 106. Communication module 130 may integrate hard-wire connected, radio-frequency, and contactless (e.g., NFC) ways to communicate between devices. It may be noted that these various communication means may reside within or be implemented using different physical components. As seen in FIG. 1, communication module 130 may implement communication in using a multiplicity of systems and protocols. For example, communication module 130 may implement communication using wireless systems such as: Wi-Fi, Bluetooth, GSM, or others, and using NFC (or contactless) systems and protocols such as HCI (Host Controller Interface), NCI (NFC Controller Interface); CE (Card Emulation) mode; P2P (peer-to-peer); LLCP (Logical Link Control Protocol); NFCIP-1 (NFC Interchange and Protocol-1); NDEF (NFC Data Exchange Format); NPP (NDEF Push Protocol); SNEP (Simple NDEF Exchange Protocol); or CLF (Contactless Front End).

Mobile device 104 may include a secure elements broker 140. Secure elements broker 140 may be implemented, for example, as a process executing on mobile device 104 and may, for example, be physically embodied as computer readable and executable instructions stored in a memory of mobile device 104. Secure elements broker 140 may be considered as a logical technology with the ability to use existing hardware components and functions (e.g., low-level drivers). To do so, it may be an underlying component to an existing application (e.g. wallet 142) or integrated at the operating system (OS) level (e.g., Android). In some instances, it may be possible for specific devices to have the secure elements broker 140 be executed from a secure OS launched at boot up time in parallel with unsecure normal OS operations.

The secure elements broker 140 internal logic may allow for the creation of containers (e.g., C1, C2, C3 shown in FIG. 1) that may provide an area to store a list or lists 144 of applications executed from secure elements (e.g., applets or trustlets 146 shown in FIG. 1). These containers (e.g., C1, C2, C3) may be assigned to various functions, such as specific communication channels, specific payment kernels (e.g., Visa, MasterCard, PayPal), specific services (transit, access, payments). Thus, secure elements broker 140 may create an index list of available secure applications with a smart location mapping of these applications within the devices, for example, in a multi-SE environment. The role of the secure elements broker 140 may be to point to the right path, during the selection process, for which one or more applications are optimized for a specific call (e.g., a transaction conducted between mobile device 104 and reader device 106) and to make sure the activation or wake-up signal is sent to the SE containing such applications (or apps). In order to connect to the proper SE, the secure elements broker 140 may be able (if authorized) to read low-level drivers and potentially turn them on or off to wake up the proper SEs. The relevant protocols may include i2C, SCI, SWP, or others, as known in the art.

System 100 may include a reader device 106, e.g., a card reader or wireless terminal located at a point of sale (POS). Reader device 106 may include a communication interface 160 that may be similar to communication module 130. Reader device 106 may include kernels 161, 162, 163, 164 that would expect to find counterparts in a device (e.g., mobile device 104) calling upon them. However, a kernel may be able to "read" multiple applications on the mobile side (e.g., from mobile device 104). Hence, the secure elements broker 140 may present the best option to the reader kernel (e.g., whichever one of kernels 161, 162, 163, 164 that is active) based on preferences and settings (see, for example, FIG. 3).

Figure 2:
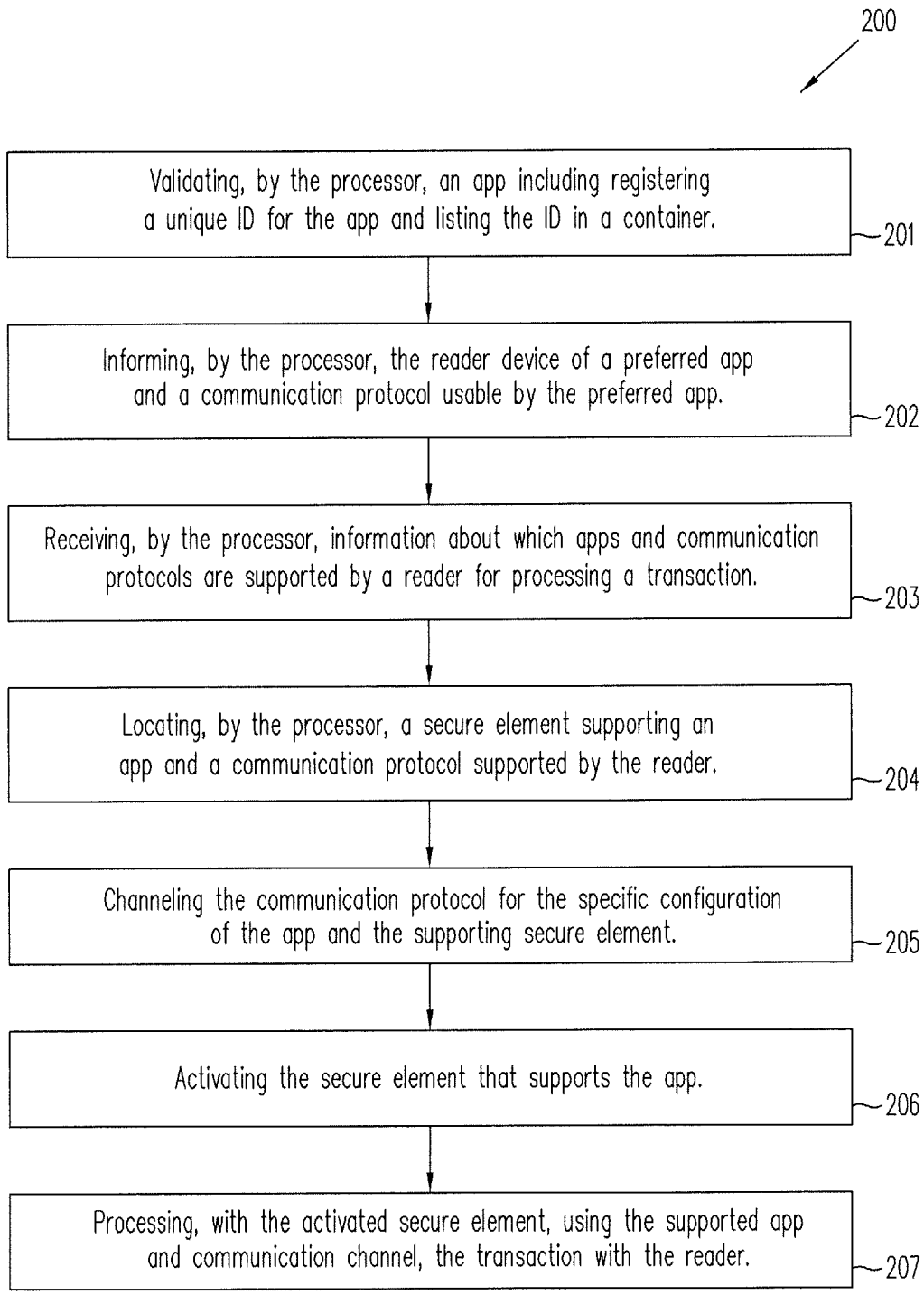
FIG. 2 is a flow chart illustrating a method for managing concurrent secure elements on a mobile device in accordance with an embodiment.

FIG. 2 illustrates a method 200 for managing concurrent secure elements on a mobile device, in accordance with an embodiment.

At step 201, method 200 may provide enrollment or registration for apps resident on mobile device 104. Method 200 may include validating, by the processor, an app including registering a unique ID for the app and listing the ID in a container. For example, when an application or applet is provisioned (e.g., downloaded and activated) on the mobile device 104, the app contains some unique ID. The secure elements broker 140 could employ an existing standard accepted identifier or rely on its own signature and ID mechanism to validate the legitimacy of an application or applet. (In the case of an applet, the ID is normally stronger as the process to provision the applet in the right SE is normally done from a controlled and secure environment following strict security processes.) Then, when the user or the service provider or apps provider decides to "register" the app ID with the secure elements broker 140, the ID is listed in a unique "container" (e.g., C1, C2, C3 shown in FIG. 1). Each container may be assigned different parameters based on, for example, usage or protocols. For example, the secure elements broker 140 could be used to manage specific usability cases—for example, C1 for transit, C2 for payment, C3 for social—specific protocols—for example, C1 for NFC, C2 for WiFi, C3 for Bluetooth, or specific providers—for example, C1 for PayPal, C2 for Google, C3 for Amazon. A cross-referencing of containers may be performed using a multi-layer matrix (e.g., matrix 300 shown in FIG. 3) within the secure elements broker 140.

A call between mobile device 104 and reader device 106 (by which a transaction may be conducted between mobile device 104 and reader device 106) may be application or user initiated or, alternatively, may be reader initiated. In each case, method 200 may perform similarly described actions at steps 202 through 207 that conform to the particular details of each case.

In the application or user initiated case (e.g., call initiated from user mobile device 104), a user may launch an application that partially relies on being "validated" or "approved" by a (secondary) applet residing on an SE (e.g., SE 121, 122, or 123 on mobile device 104). This allows controlling "fake" apps (e.g., an app not residing on an SE) to perform critical steps of an app process without linking to the secondary applet. Applications are frequently updated more often than applets, however, and the user may also decide to change the settings or parameters for apps at any point of time. It is also possible for a user to move some client application from one area of the mobile device 104 to another. For example, eBay apps on Android may be stored on the apps processor of the phone or in an mSD card. This constant variability may be accommodated by the secure elements broker 140. When an app is able to communicate with the secure elements broker 140 to access or call on its applet, even if the app is moved around or the applet is moved from one SE to another, the secure elements broker 140 may still be able to point to the right place. This also allows for easier communication channel management (e.g., matching the correct communication protocol with the launched app). For example, suppose an app using applet 1 in eSE is to trigger the NFC P2P LLCP protocol, but an app using applet 2 in UICC is to trigger a GSM communication, then the secure elements broker 140 can channel and "activate" the proper protocol for the specific configuration of the apps.

In the reader initiated case (e.g., call initiated from reader device 106), whatever the communication trigger is, the reader may talk "light" (e.g., provide information for establishing a connection or link) to the secure elements broker 140 via the proper channel (NFC CE for example) and deliver the proper request to the secure elements broker 140. For example, reader 106 may provide information to mobile device 104 that "I am a reader in NFC CE mode and I want to complete a PayPal transaction with security validation." A next step for the secure elements broker 140 may be to "check" against its known list of containers (e.g., C1, C2, C3 shown in FIG. 1) as to the location of the PayPal app that will be able to complete the process. Secure elements broker 140 may "know", for example, that in this specific request, the PayPal app is actually an applet residing in a trusted or secure zone environment (e.g., the Trust Zone environment of SE 123) and is known as Trustlet 2. At that point, the device will be activating the secure world or portion of Trust Zone, technically waking up the PayPal Trustlet to handle the request from the reader 106. The binding between the two devices—mobile device 104 and reader device 106—may now be optimized and may break as the required task is completed, technically shutting down the secure world of Trust Zone on the phone side (on mobile device 104) and the NFC P2P LLCP channel between the two devices.

One important consideration is that the reader 106 may be in control of the chosen app by the way of pre-loaded apps kernels (e.g., kernels 161-164). So the reader may interrogate the phone (e.g., mobile device 104), which activates an SE, and the SE communicates its supported app IDs, and the reader 106 then selects one. In a multi-SE environment, this may be sub-optimal. For example, SE 121 (e.g., a SIM) might contain app A, and SE 122 (e.g., a microSD) might contain app B. The reader 106 (or the customer, user of mobile device 104) may have a preference between these apps, but conventionally, the reader 106 will only be offered either app A or app B without regard to preference. A protocol made possible with a secure elements broker 140 is to have secure elements broker 140 in between the two devices which might enforce the customer's preferences. For example, if the customer prefers app B and if the reader supports apps A and B, the secure elements broker 140 could ensure that app B is chosen. Also the proper SE is always "powered up" to release the real (SE resident) app, knowing from the beginning where to look because of the pre-known list of containers. This allows bypassing the problem that may arise of multiple SEs that are powered up at the same time, creating prioritization and latency issues at the physical and logical level of a device.

In accordance with the descriptions given above and examples provided below with reference to FIG. 3, method 200, at step 202, may include informing, by the processor of mobile device 104, the reader device 106 of a preferred app and a communication protocol usable by the preferred app. At step 203, method 200 may include receiving, by the processor, information about which apps and communication protocols are supported by the reader for processing a transaction. At step 204, method 200 may include locating, by the secure elements broker 140 running on a processor of mobile device 104, a secure element supporting an app and a communication protocol supported by the reader. At step 205, method 200 may include channeling the communication protocol for the specific configuration of the app and the supporting secure element. At step 206, method 200 may include activating the secure element that supports the app. At step 207, method 200 may include processing, with the activated secure element, using the supported app and communication channel, the transaction with the reader.

FIG. 3 illustrates an example of a matrix 300 for managing concurrent secure elements on a mobile device in accordance with an embodiment. Matrix 300 illustrates one example of a matrix assignment reflecting a particular configuration, for example, of mobile device 104. Matrix 300 shown in FIG. 3 illustrates an example of how various parameters could be assigned to various secure elements (e.g., secure elements 121, 122, 123) to help the secure elements broker 140 choose the proper path to find the right apps. In this example, the communication protocol is limited to NFC. The example could be extended, however, to any mode of contact and contactless communication. Kernels describe what type of "payment process" is supported and, if additional services are supported by the selected apps, the preferences—such as loyalty-reward, couponing, or discount, for example.

To illustrate how to read matrix 300, in the case of the UICC as a secure element "hosting" four applications, it can be seen that: (1) Application 1 can communicate only via NFC P2P (NDEF) from within the ISIS wallet kernel and also supports couponing; (2) Application 2 is a PayPal (PP) app supporting Card Emulation (CE) and reward; (3) Application 3 is tag only (LLCP, reader/writer) linked to Visa and used for reward purposes (for example, a hospitality tag inviting the user to instantly sign up for a Visa card and get a reward); and (4) Application 4 is also tag (LLCP) but on the MasterCard network and does not have any additional services.

EXAMPLES ILLUSTRATED BY FIG. 3

Example Call 1: "Normal" Call
Mobile apps (NDEF; PP)
Reader reader (NDEF; kernel 4)
Mobile SEB_settings (prefC3; Trustlet1; vSE; kernel 4; NDEF)

The mobile device 104 communicates with another device (e.g. reader 106, phone, POS, tablet, etc.) and informs the reader device that its preferred payment app is PayPal in NFC P2P mode (NDEF).

The reader device replies: "yes, I support NDEF and PayPal kernel is kernel 4 in my system".

Mobile device 104 then completes the transaction via the secure elements broker 140 which knows that in this specific device 104, the preferred container for PayPal (or NDEF, depending on architecture decision) is C3 which contains a link to the PayPal Trustlet (Trustlet 1) inside virtual Secure Element (or Trust Zone) 123, which is able to communicate with the reader via Kernel 4 in NFC P2P mode (NDEF).

At that point, if the mobile device 104 has another Secure Element activated, it will know that it needs to do a power down or hibernate for this one and activate the vSE to complete that transaction.

Priorities assignment and latencies from a hardware point of view are not addressed here and should be viewed on a case by case basis depending on the device design as well as business agreements between various parties.

Example Call 2: Reader Device Dominates Mobile Device Preference
    Mobile apps (NDEF; PP)
    Reader reader (FailNDEF; CE; Kernel 1/2/3)
    Mobile SEB_settings (C1; App4; eSE; kernel 1; CE)

The reader device 106 is in charge of the transaction and "picks" which apps it will support inside the phone (e.g., mobile device 104). In that case, the secure elements broker 140 is just a gateway or filter for the reader 106.

In the reader dominance case, the first step may be similar to the normal call case with the phone (e.g., mobile device 104) informing the reader 106 of its preferences. In this particular example, however, the reader 106 replies that it does not support NFC P2P but Card Emulation only, and only applications that can be read by Kernel 1, 2 or 3 (Visa. MC, Amex).

The mobile device 104 secure elements broker 140 then goes down its list of preferences and determines that the first best alternative to its preferred method with that specific reader will be to launch application 4 from container C1 (assigned to Card Emulation mode in that case) contained in the embedded Secure Element 122 which can read Kernel 1 (Visa) in CE mode.

Example Call 3: Mobile Device Dominates Reader Device Decision
    Mobile apps (NDEF; PP)
    Reader reader (prefCE/NDEF/LLCP; prefKernel 1/2/4/5;)
    Mobile SEB_settings (C2; App2; eSE; kernel 4; CE)

In the mobile device dominance case, the first step may be similar to the normal and reader dominance calls with the phone (e.g., mobile device 104) informing the reader 106 of its preferences.

The reader 106 may reply, in this example, that its supported modes of communication are all NFC modes and its supported kernels are Visa, MC, PayPal, and Google. At that point, the reader 106 is giving full control to the mobile device 104 to pick whichever application it wants to use.

The mobile device 104 replies that the path to the application to be used is contained in container C2, identified as application 2 residing in the eSE and able to "talk" with Kernel 4 (PP) via Card Emulation mode.

It may be noted that preferences may be set up by the secure elements broker provider, by the users, or by the service provider for the application provided (which may be a merchant, for example). With multiple secure elements and multiple preferences prioritization, the secure elements broker 140 may be able to make an instant decision on the most appropriate path depending on the highest control entity preferences (e.g., device owner vs. user vs. provider vs. other).

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A contactless transaction communication system comprising:
 a mobile device configured to communicate using contactless communication with a reader device, for receiving information from the reader device about which apps and communication protocols are supported by the reader device for processing a transaction;
 a data storage device of the mobile device including a non-transitory computer-readable medium for storing a plurality of apps resident on the mobile device;
 a processor in communication with the data storage device for executing one or more of the plurality of apps resident on the mobile device; and
 an application broker, running on the processor of the mobile device, for communicating between the mobile device and the reader device by:
  locating from the plurality of apps resident on the mobile device, a preferred app supported by the reader device and configured to use one or more communication protocols supported by the reader device, wherein the preferred app is selected according to a preference setting on the mobile device; and
  activating the preferred app and a communication channel according to a specific configuration of the preferred app, the communication channel, and a communication protocol from the one or more communication protocols supported by the reader device so that the transaction with the reader device is processed by the processor of the mobile device with the preferred app over the activated communication channel and using the communication protocol supported by the reader device.

2. The system of claim 1, further comprising:
 a plurality of containers wherein each container provides an index list of apps from the plurality of apps resident on the mobile device according to which the preferred app is selected based on the preference setting and the information received from the reader device about which apps and communication protocols are supported by the reader device for processing the transaction.

3. The system of claim 1, further comprising:
 a plurality of containers wherein each container is assigned a function according to which the preferred app is selected; and
 for each function, the container to which the function is assigned provides a mapping for the locating of the preferred app by the application broker according to the function.

4. The system of claim 1, further comprising:
 a plurality of containers wherein each container is assigned a function according to which the preferred app is selected, wherein the function is one of communication channels, payment kernels, and services; and
 for each function, the container to which the function is assigned provides a mapping for the locating of the preferred app by the application broker according to the function.

5. The system of claim 1, further comprising:
 a plurality of containers wherein each container provides a mapping by which the application broker locates the preferred app as an app optimized for a specific transaction conducted between the mobile device and the reader device according to the preference setting and the information received from the reader device about which apps and communication protocols are supported by the reader device for processing the transaction.

6. The system of claim 1, further comprising:
 a plurality of containers wherein each container provides a list of one or more apps from the plurality of apps resident on the mobile device; and
 the plurality of apps are organized into the containers by a user of the mobile device.

7. The system of claim 1, wherein:
 the preference setting is stored on the data storage device; and
 the locating is performed according to a prioritization of preferences according to a user, a device owner, an application broker provider, or a service provider for one of more of the plurality of apps resident on the mobile device.

8. A computer processor implemented method comprising:
 receiving, by the processor of a mobile device via contactless communication with a reader device, information from the reader device about which apps and communication protocols are supported by the reader device for processing a transaction;

locating, by an application selector running on the processor of the mobile device, based on one or more preference settings on the mobile device and the information received from the reader device, from a plurality of apps resident on the mobile device, a preferred app supported by the reader device and configured to use one or more communication protocols supported by the reader device;

activating, by the application selector running on the processor of the mobile device, the preferred app and a communication channel according to a specific configuration of the preferred app, the communication channel, and a communication protocol from the one or more communication protocols supported by the reader device; and processing the transaction with the reader device, by the processor of the mobile device with the preferred app over the activated communication channel and using the communication protocol supported by the reader device.

9. The method of claim 8, further comprising:
setting each of the one or more preference settings on the mobile device by one of a user, a device owner, an application selector provider, or a service provider for one of more of the plurality of apps resident on the mobile device.

10. The method of claim 8, wherein locating further comprises:
checking a plurality of containers according to a function assigned to each container; and
using a mapping provided by a container, whose function is appropriate for the preference settings, the transaction, and the information received from the reader device, to locate the preferred app.

11. The method of claim 8, wherein locating further comprises:
checking a plurality of containers according to a function assigned to each container, wherein the function is one of communication channels, payment kernels, and services; and
locating the preferred app using a mapping provided by a container for which the function assigned to the container matches a preference setting for the transaction and the information received from the reader device.

12. The method of claim 8, wherein locating further comprises:
locating the preferred app according to a prioritization of preferences set by a user of the mobile device.

13. The method of claim 8, wherein locating further comprises:
locating the preferred app according to a prioritization of preferences for an app optimized for the transaction.

14. The method of claim 8, wherein activating further comprises:
informing, by the processor of the mobile device, the reader device of a preferred app and a communication protocol usable by the preferred app.

15. A non-transitory computer-readable medium comprising instructions which, in response to execution by a processor of a mobile device, cause the mobile device to perform a method comprising:
receiving, by the processor of the mobile device via contactless communication with a reader device, information from the reader device about which apps and communication protocols are supported by the reader device for processing a transaction;

locating, by a preference enforcer running on the processor of the mobile device, based on one or more preference settings on the mobile device and the information received from the reader device, from a plurality of apps resident on the mobile device, a preferred app supported by the reader device and configured to use one or more communication protocols supported by the reader device;

activating, by the preference enforcer running on the processor of the mobile device, the preferred app and a communication channel according to a specific configuration of the preferred app, the communication channel, and a communication protocol from the one or more communication protocols supported by the reader device; and processing the transaction with the reader device, by the processor of the mobile device with the preferred app over the activated communication channel and using the communication protocol supported by the reader device.

16. The non-transitory computer-readable medium of claim 15 wherein the method further comprises:
locating the preferred app according to a prioritization of preferences set by a user of the mobile device.

17. The non-transitory computer-readable medium of claim 15 wherein the method further comprises:
checking a plurality of containers for a location of the preferred app.

18. The non-transitory computer-readable medium of claim 15 wherein the method further comprises:
checking a plurality of containers for the location of an app optimized for the transaction for locating the preferred app.

19. The non-transitory computer-readable medium of claim 15, wherein the method further comprises:
checking a plurality of containers, organized according to one or more of communication channels, payment kernels, and services, for locating the preferred app.

20. The non-transitory computer-readable medium of claim 15, wherein the method further comprises:
enforcing a user preference onto the reader device by informing, by the processor of the mobile device, the reader device of a preferred app supported by the reader device that uses a communication protocol supported by the reader device.

* * * * *